(12) United States Patent
Tomlinson

(10) Patent No.: US 7,753,214 B2
(45) Date of Patent: Jul. 13, 2010

(54) SYSTEMS AND METHODS FOR EXTRACTING LIQUID FROM AN AQUEOUS MATERIAL

(75) Inventor: Charles Davie Tomlinson, Mesa, AZ (US)

(73) Assignee: Concrete Slurry Environmental, Inc., Phoenix, AZ (US)

(*) Notice: Subject to any disclaimer, the term of this patent is extended or adjusted under 35 U.S.C. 154(b) by 0 days.

(21) Appl. No.: 12/205,765

(22) Filed: Sep. 5, 2008

(65) Prior Publication Data

US 2009/0065450 A1 Mar. 12, 2009

Related U.S. Application Data

(60) Provisional application No. 60/970,690, filed on Sep. 7, 2007.

(51) Int. Cl.
*B01D 29/00* (2006.01)
*B01D 35/00* (2006.01)
*C02F 1/00* (2006.01)

(52) U.S. Cl. ............... 210/416.1; 210/104; 210/172.3; 210/237; 210/398; 210/406

(58) Field of Classification Search ............... 210/97, 210/103, 104, 172.3, 359, 386, 398, 399, 210/406, 416.1, 485, 489, 744, 86, 436, 472; 106/709, 713, 739, 740; 100/90, 110
See application file for complete search history.

(56) References Cited

U.S. PATENT DOCUMENTS

| | | | | |
|---|---|---|---|---|
| 3,970,552 A | * | 7/1976 | Bongert | 210/780 |
| 6,709,586 B2 | * | 3/2004 | Mason | 210/237 |
| 6,911,145 B2 | * | 6/2005 | Hutchinson et al. | 210/258 |

\* cited by examiner

*Primary Examiner*—Matthew O Savage
*Assistant Examiner*—Paul J Durand
(74) *Attorney, Agent, or Firm*—Holland & Hart

(57) ABSTRACT

A liquid extraction unit for extracting liquid from an aqueous material is described. The unit includes a filter that is configured to allow passage of the liquid and prevent passage of the aqueous material. The unit also includes a first vacuum that is configured to extract air from the extraction unit. The unit further includes a second vacuum that is configured to pull the liquid through the filter. The first vacuum and the second vacuum are located after the filter.

9 Claims, 8 Drawing Sheets

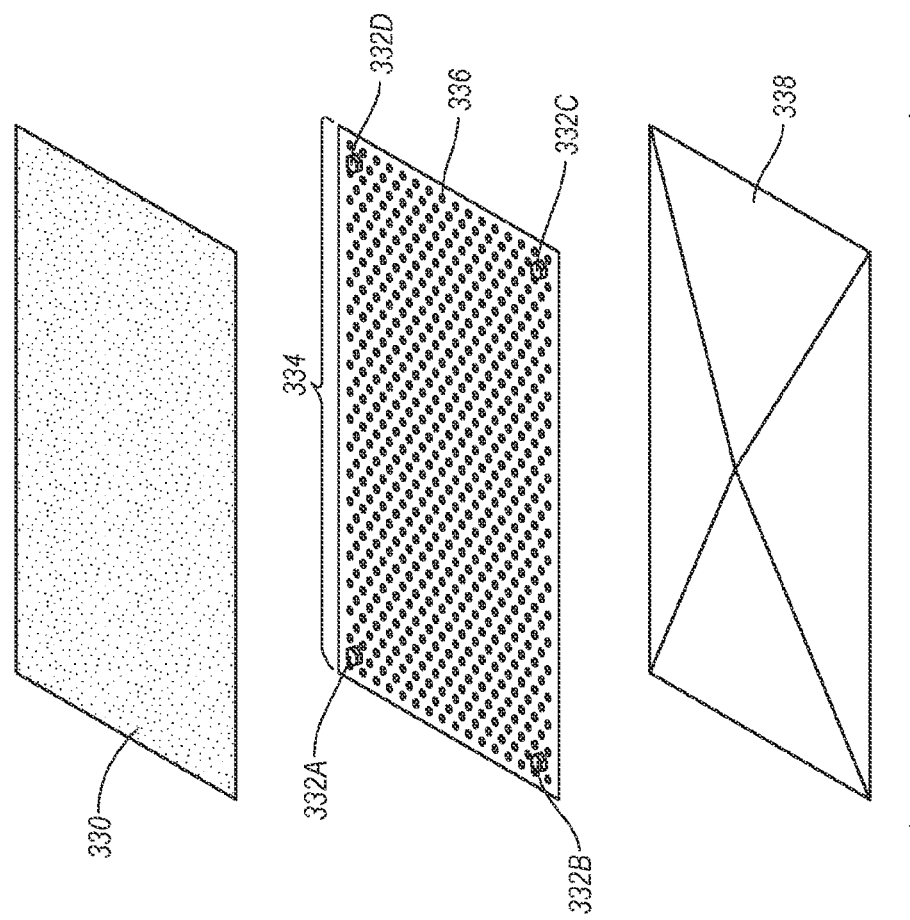
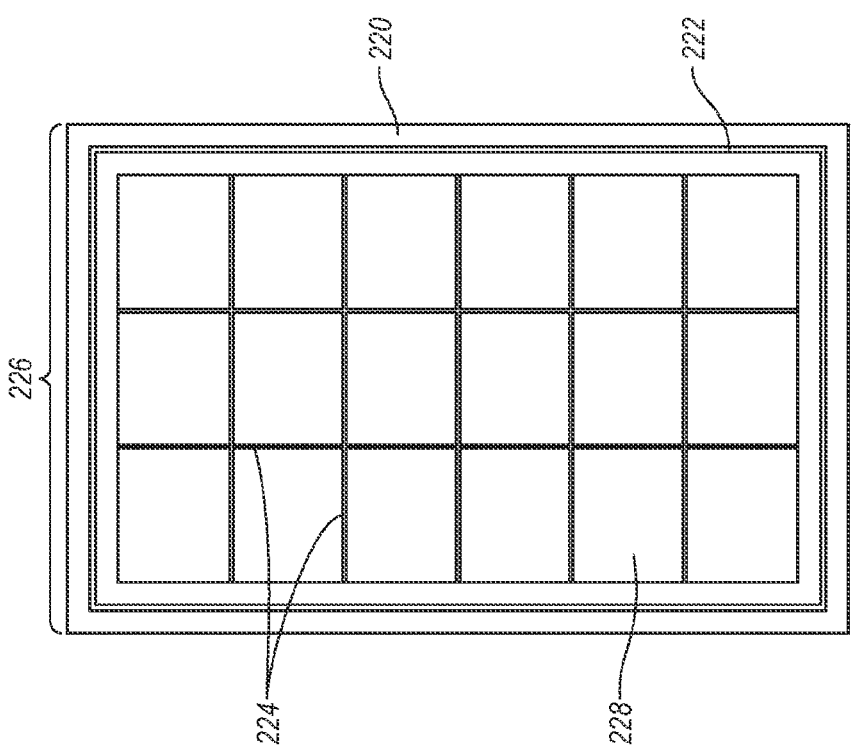
Fig. 3
Fig. 2

SYSTEMS AND METHODS FOR EXTRACTING LIQUID FROM AN AQUEOUS MATERIAL

RELATED APPLICATIONS

This application is related to and claims priority from U.S. Patent Application Ser. No. 60/970690 filed 7 Sep. 2007, for a METHOD AND APPARATUS FOR DE-WATERING SLURRY, with inventor Charles David Thomlinson, which is incorporated herein by reference.

TECHNICAL FIELD

The present disclosure relates generally to liquid extraction methods and devices. More specifically, the present disclosure relates to systems and methods for extracting liquid from an aqueous material.

BACKGROUND

Portland cement is a common type of cement in general usage in many parts of the world, as it is a basic ingredient of concrete, mortar, stucco, grout, etc. Concrete is a composite material consisting of aggregate (i.e., gravel and sand), cement, and water. As a construction material, concrete may be cast in almost any shape desired, and once hardened, may become a structural load bearing element.

Once the concrete has hardened, the concrete may be cut, grinded, or altered in any other way. A liquid, such as water, may be applied to the hardened concrete during the cutting, grinding, or alteration process. The liquid may lubricate the hardened concrete and control the dust that is created as a result from the cutting, grinding, or alteration of the concrete. The addition of the liquid (such as water) to the concrete results in a Portland cement concrete (PCC) aqueous material. This aqueous material may be referred to as slurry.

The resulting slurry may have a high pH level due to the liquid (such as water) being reintroduced to the concrete during a cutting, grinding, or alteration process. For example, when water is reintroduced to concrete during a cutting process, unhydrated lime content in the concrete attempts to reset as it did when the concrete was originally formed.

Difficulties in removing water from the slurry are encountered once the slurry is allowed to settle. Upon settling, the slurry tends to compact together, forming a substantially impermeable layer. While the lowest layer of slurry has a relatively low liquid content, successive layers of the slurry disposed upwardly have relatively high water content.

The problem of dewatering slurry trapped above a compacted layer of slurry increases dramatically whenever this layer is formed from a relatively homogeneous suspension which has a high percentage of gravel and sand. In such a situation, bonding between the slurry is inhibited, reducing the ability of the concrete to settle properly.

As such, benefits may be realized by providing a dewatering solution for an aqueous material, such as slurry. In particular, benefits may be realized by providing improved system and methods for extracting liquid from the aqueous material.

BRIEF DESCRIPTION OF THE DRAWINGS

FIG. 2 is one example of a material shaping structure that may be included in a liquid extractor;

FIG. 3 is one example of a filter, a perforation structure, and a lid that may be included as part of the liquid extractor;

SUMMARY

Figure 1:
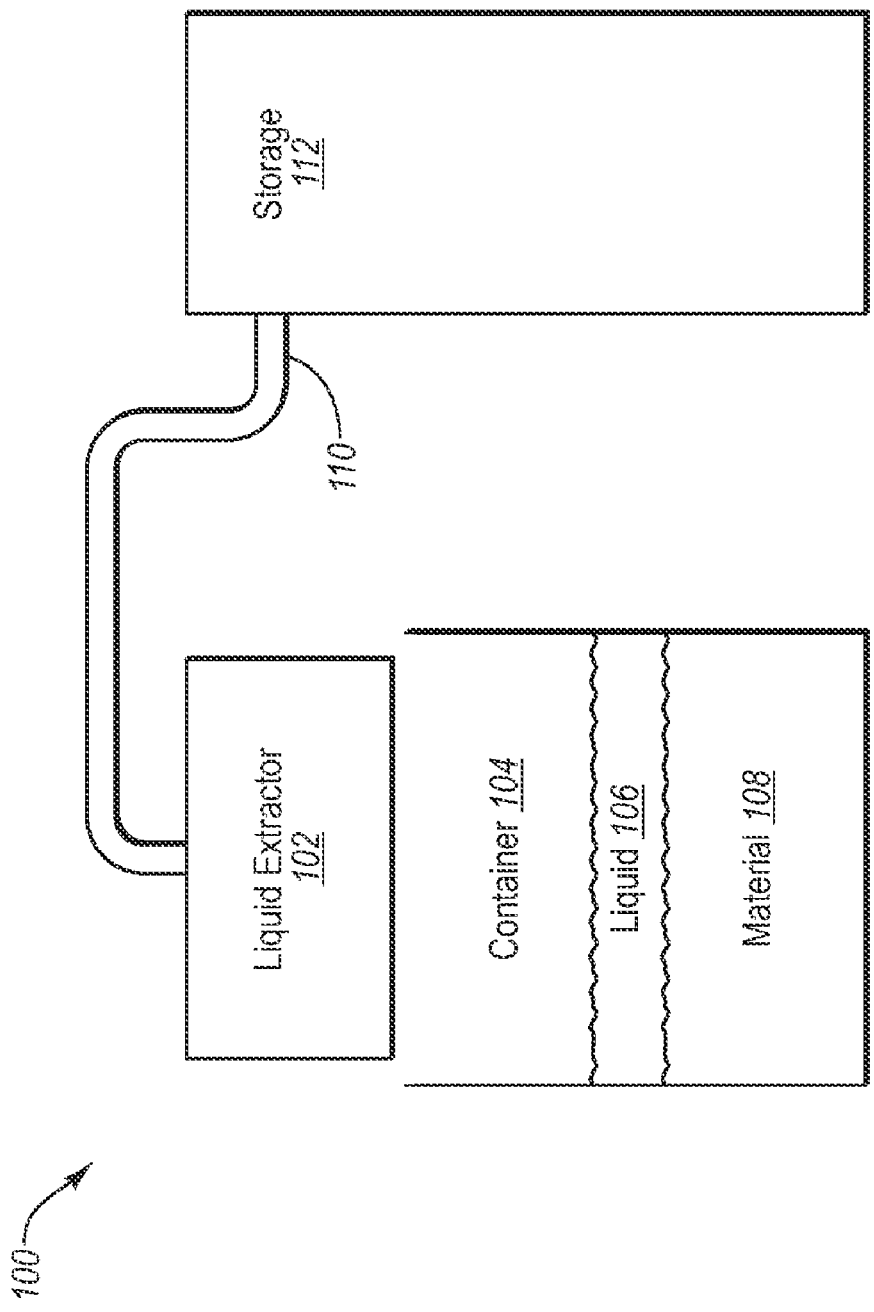
FIG. 1 is a block diagram illustrating one embodiment of a liquid extraction system.

A liquid extraction unit for extracting liquid from an aqueous material is described. The unit includes a filter configured to allow passage of the liquid and prevent passage of the aqueous material. The unit also includes a first vacuum configured to extract air from the extraction unit. The unit further includes a second vacuum configured to pull the liquid through the filter. The first vacuum and the second vacuum is located after the filter.

In one embodiment, the liquid extraction unit is connected to a lowering assembly that lowers the extraction unit. The lowering assembly may be an hydraulic cylinder.

In one configuration, a drop rate of the liquid extraction unit is controlled by a programmable logic controller. The drop rate may be determined by the amount of liquid within the extraction unit that is below the filter. In addition, the drop rate may be determined by the amount of liquid within the extraction unit that is above the filter. Further, the drop rate may be determined by the weight of the extraction unit. In one embodiment, the weight of the extraction unit is determined by the hydraulic pressure on the lowering assembly.

A liquid transfer tube may be configured to transfer liquid from the extraction unit to an external storage container. In one configuration, one or more side pockets may be configured to collect and store the liquid until the liquid is transferred from the extraction unit to an external storage container.

A method for extracting liquid from an aqueous material is also described. A liquid extraction unit is positioned over a container that contains the aqueous material. The liquid extraction unit is lowered into the container. A vacuum force within the liquid extraction unit is activated. Liquid is extracted from the aqueous material into the extraction unit using the vacuum force.

In one embodiment, the extracted liquid is filtered through a filter. The liquid extraction unit may be lowered into the container with an hydraulic cylinder. A drop rate of the liquid extraction unit may be controlled with a programmable logic controller. The drop rate may be determined by the amount of liquid within the extraction unit that is below the filter within the extraction unit. The drop rate may also be determined by the amount of liquid within the extraction unit that is above the filter within the extraction unit. The drop rate may further be determined by the weight of the extraction unit. The weight of the extraction unit may be determined by the hydraulic pressure on a lowering assembly connected to the liquid extraction unit. In one configuration, liquid is transferred from the extraction unit to an external storage container.

A programmable logic controller that is configured to control a liquid extraction unit for extracting liquid from an aqueous material is also described. The controller includes a processor and memory in electronic communication with the processor. Instructions may be stored in the memory. The instructions may be executable to position the liquid extraction unit over a container that contains the aqueous material, lower the liquid extraction unit into the container, activate a vacuum force within the liquid extraction unit, and extract liquid from the aqueous material into the extraction unit using the vacuum force.

DETAILED DESCRIPTION

FIG. 1 is a block diagram illustrating one embodiment of a liquid extraction system 100. The system 100 may include a container 104 and an external storage 112. In one embodiment, a material 108 may be present in the container 104. The material 108 may be a thick suspension of solids in a liquid 106. In other words, the material 108 may be a watery mixture of insoluble matter. For example, the material 108 may be a watery mixture used in the process of forming concrete. The material 108 may be an aqueous material and may be referred to as slurry.

As illustrated, a layer of the liquid 106 may form on the surface of the material 108. In one embodiment, the liquid 106 is water that congregates on top of the material 108. A liquid extractor 102 may be lowered into the container 104 in order to extract the layer of liquid 106 that has formed on the surface of the material 108. The liquid extractor 102 may extract the liquid 106 from the container and transfer it 106 to the external storage 112. A connection 110 between the liquid extractor 102 and the external storage 112 allows the liquid 106 to flow from the liquid extractor 102 to the storage 112. The connection 110 may be a hollow tube, pipe, hose, or any other type of connecting apparatus that allows the liquid 106 to flow from the extractor 102 to the storage 112.

FIG. 2 is one example of a material shaping structure 226 that may be included in the liquid extractor 102. The shaping structure 226 may include an outer boundary 220 and an inner boundary 222. The outer and inner boundaries 220, 222 may be separate parts or they may be a single, solid structure. The inner and outer boundaries 220, 222 may be a metal material. A grid structure 224 may be installed within the open space of the inner boundary 222. The grid structure 224 may also be made of a metal material. In one embodiment, open spaces 228 formed by the grid structure 224 may receive the material 108 within the container 104. In one embodiment, the material shaping structure 226 may be lowered into the material 108 in order to shape the material 108 into separate and distinct rectangles. In other embodiment, the material shaping structure 226 may shape the material into any other shape.

FIG. 3 is one example of a filter 330, a perforation structure 334 and a lid 338 that may be included as part of the liquid extractor 102. In one embodiment, the filter 330 may allow the liquid 106 to pass through while preventing the material 108 from passing. The perforation structure 334 may be attached to the filter 330 with a plurality of bolts 332A, 332B, 332C, 332D. The perforation structure 334 may include a plurality of holes 336. The liquid 330 that passes through the filter 330 may seep through the perforation structure 334 via the plurality of holes 336. The lid 338 may be secured to the top of the liquid extractor 102 in order to enclose and protect the various part of the extractor 102.

Figure 4:
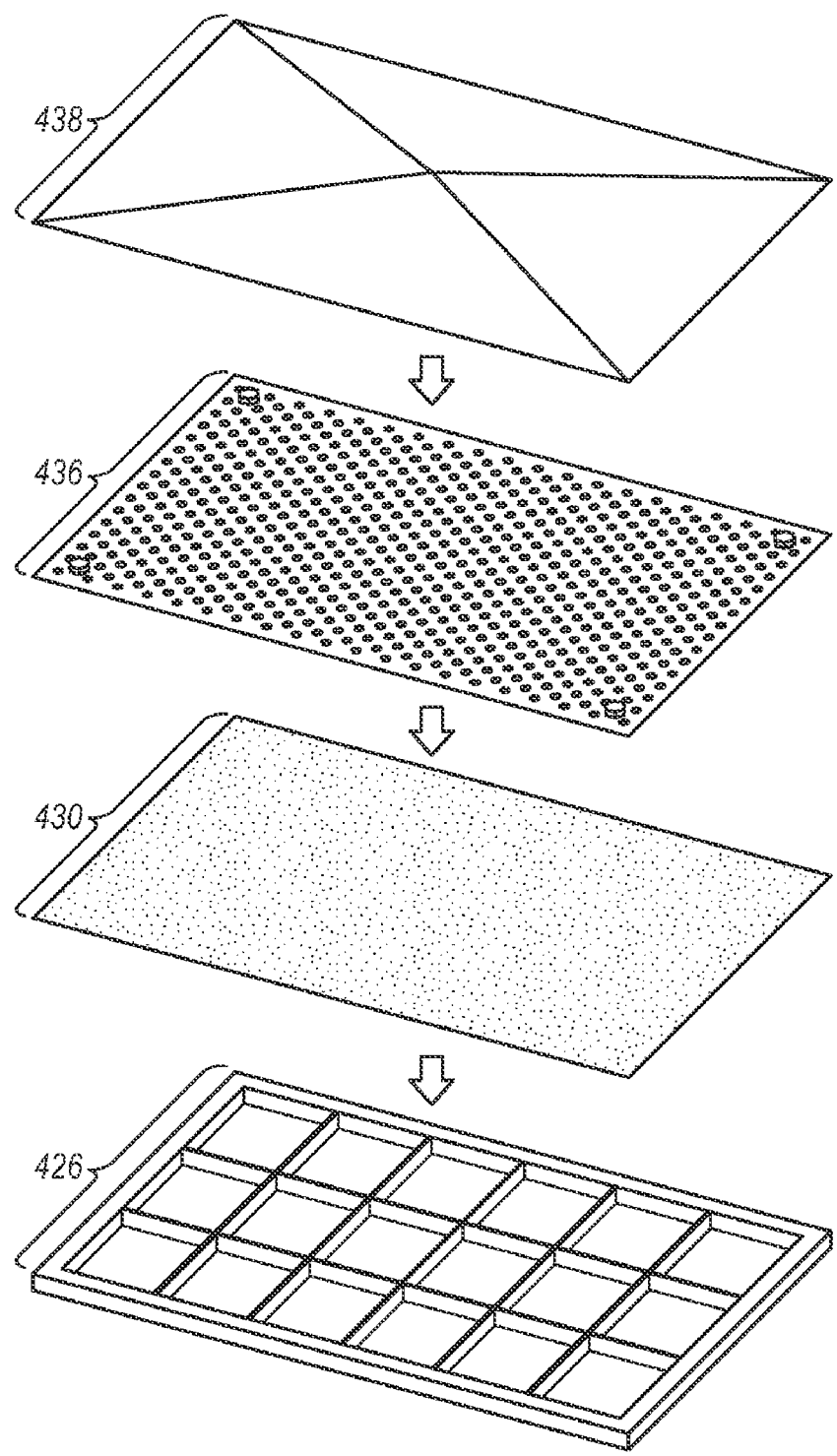
FIG. 4 is an example of one possible configuration of the assembly of various parts to form the liquid extractor.

FIG. 4 is an example of one possible configuration of the assembly of various parts to form the liquid extractor 102. For example, a material shaping structure 426 may be the base of the extractor 102. A filter 430 may be placed on top of the material shaping structure 426. In one embodiment, a perforation structure 436 may be placed on top of the filter 430 and connected to the material shaping structure 426. In addition, a lid 438 may be placed on top of the perforation structure 436 in order to enclose and protect the various parts of the liquid extractor 102.

Figure 5:
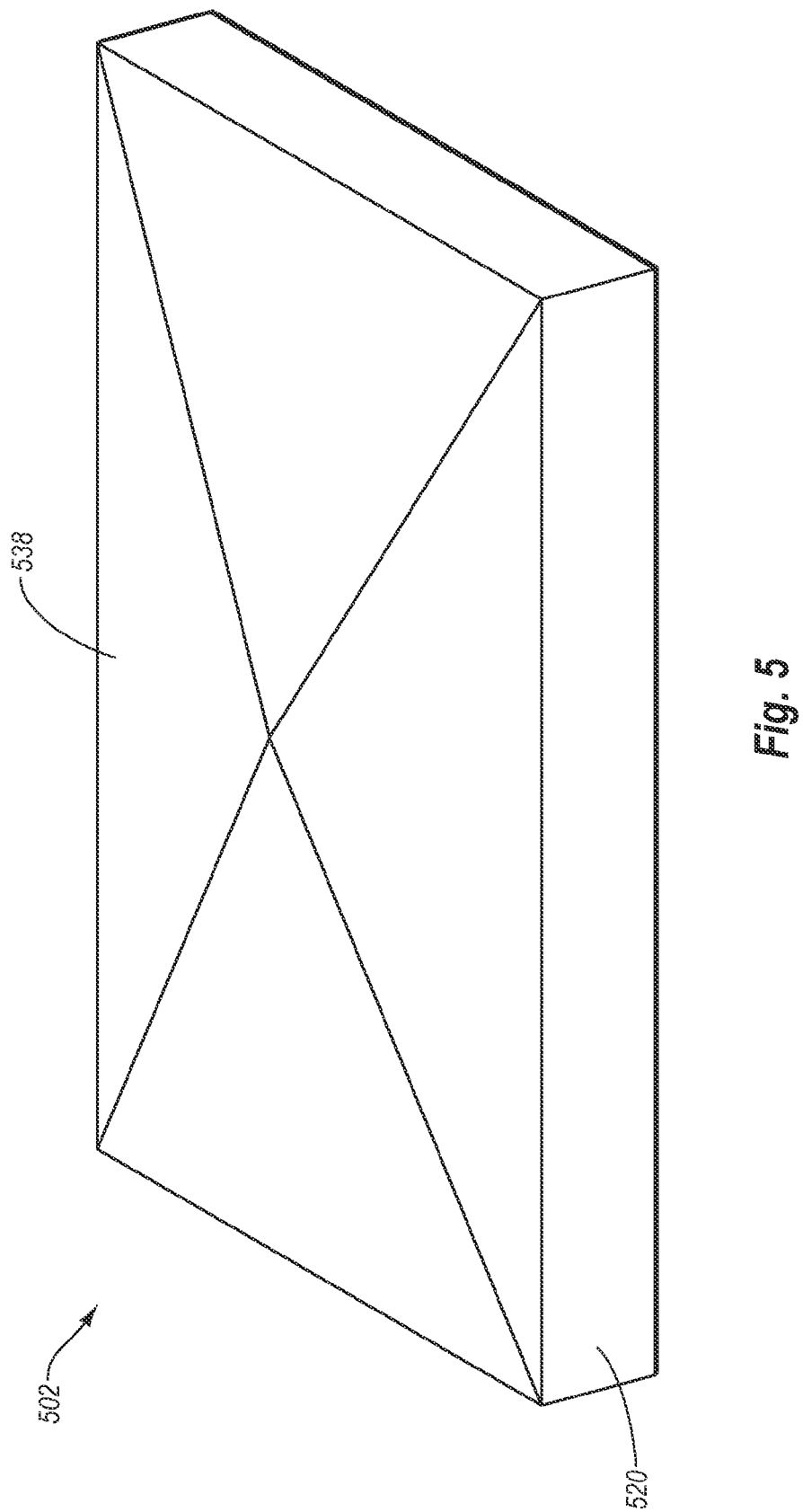
FIG. 5 is one embodiment of an assembled liquid extractor.

FIG. 5 is one embodiment of an assembled liquid extractor 502. As illustrated, the extractor 502 may include a base 520 and a lid 538. The completed extractor 502 may also include a material shaping structure (not shown), a filter (not shown), and a perforation structure (not shown). As will be described below, the liquid extractor 502 may be lowered into a container 104 that includes a material 108 (such as slurry). The liquid extractor 502 may extract liquid 106 that has accumulated on the surface of the material 108. The liquid 106 may be transferred to an external storage 112 container. The liquid extractor 502 may also be lowered into the material 108 once the liquid 106 on the surface of the material 108 has been extracted. The material shaping structure (not shown) of the extractor 502 may be depressed into the material 108 in order to organize the material 108 into a plurality of individual shapes (e.g., rectangles). The individual shaped pieces of the material 108 may then be collected and removed from the container 104 in order to be disposed.

Figure 6:
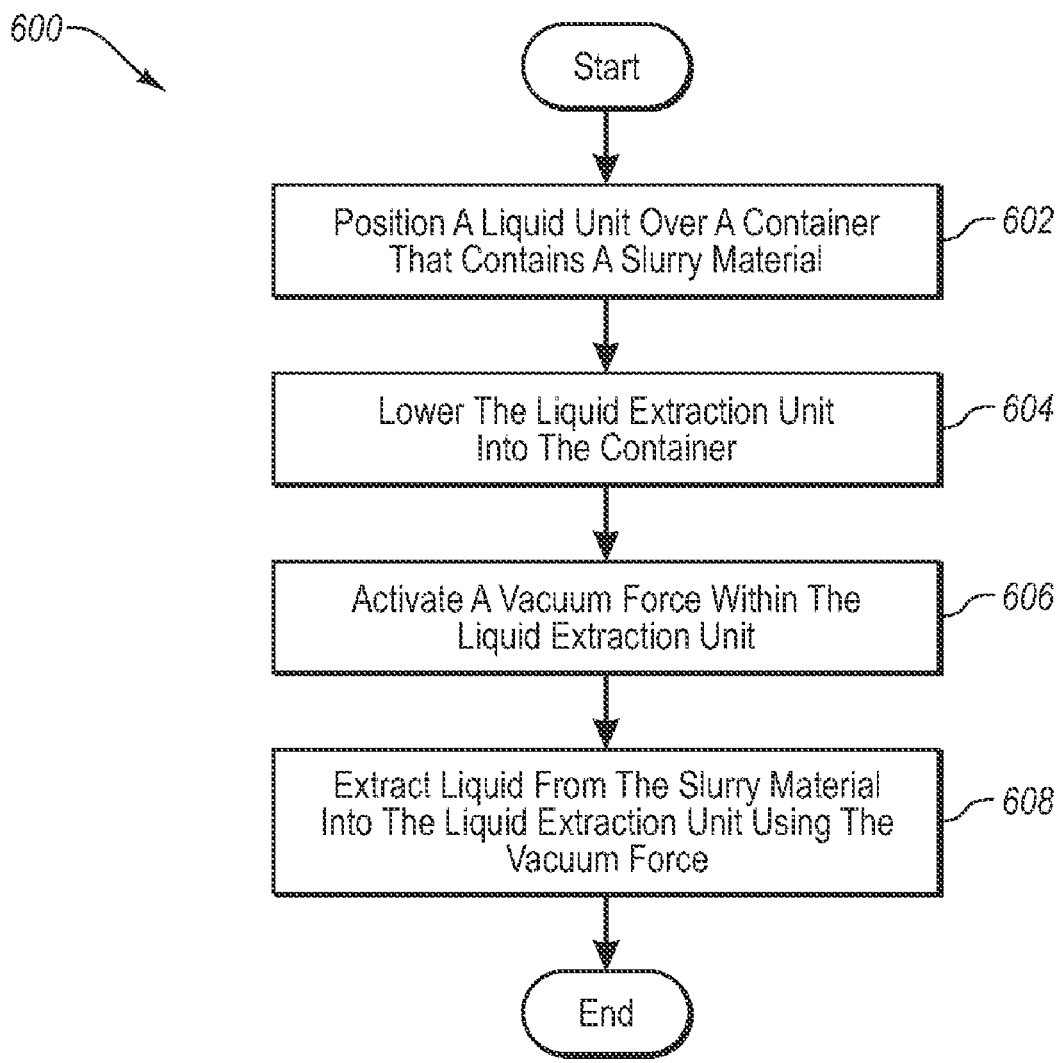
FIG. 6 is a flow diagram illustrating one embodiment of a method for extracting a liquid from a slurry material.

FIG. 6 is a flow diagram illustrating one embodiment of a method 600 for extracting a liquid from an aqueous material. The method 600 may be implemented by a liquid extraction unit, such as the liquid extractor 102 discussed above. In one embodiment, the liquid extraction unit is an inverted box structure as previously described.

In one embodiment, the liquid extraction unit may be positioned 602 over a container 104. The container 104 may include a material 108, such as a slurry material. The liquid extraction unit 102 may be lowered 604 into the container 104. For example, the extraction unit may be lowered into an aqueous material within the container and atmospheric pressure in the extraction unit 102 may decrease. The decrease in pressure may cause the aqueous material to rise within the extraction unit 102.

In one embodiment, a vacuum force within the liquid extraction unit 102 may be activated 606. The vacuum force may further assist the aqueous material within the slurry material 108 to rise to the surface of the material 108. The aqueous material on top of the surface of the slurry material 108 may be extracted 608 into the extraction unit 102 through the vacuum force and the decrease in atmospheric pressure.

Figure 7A:
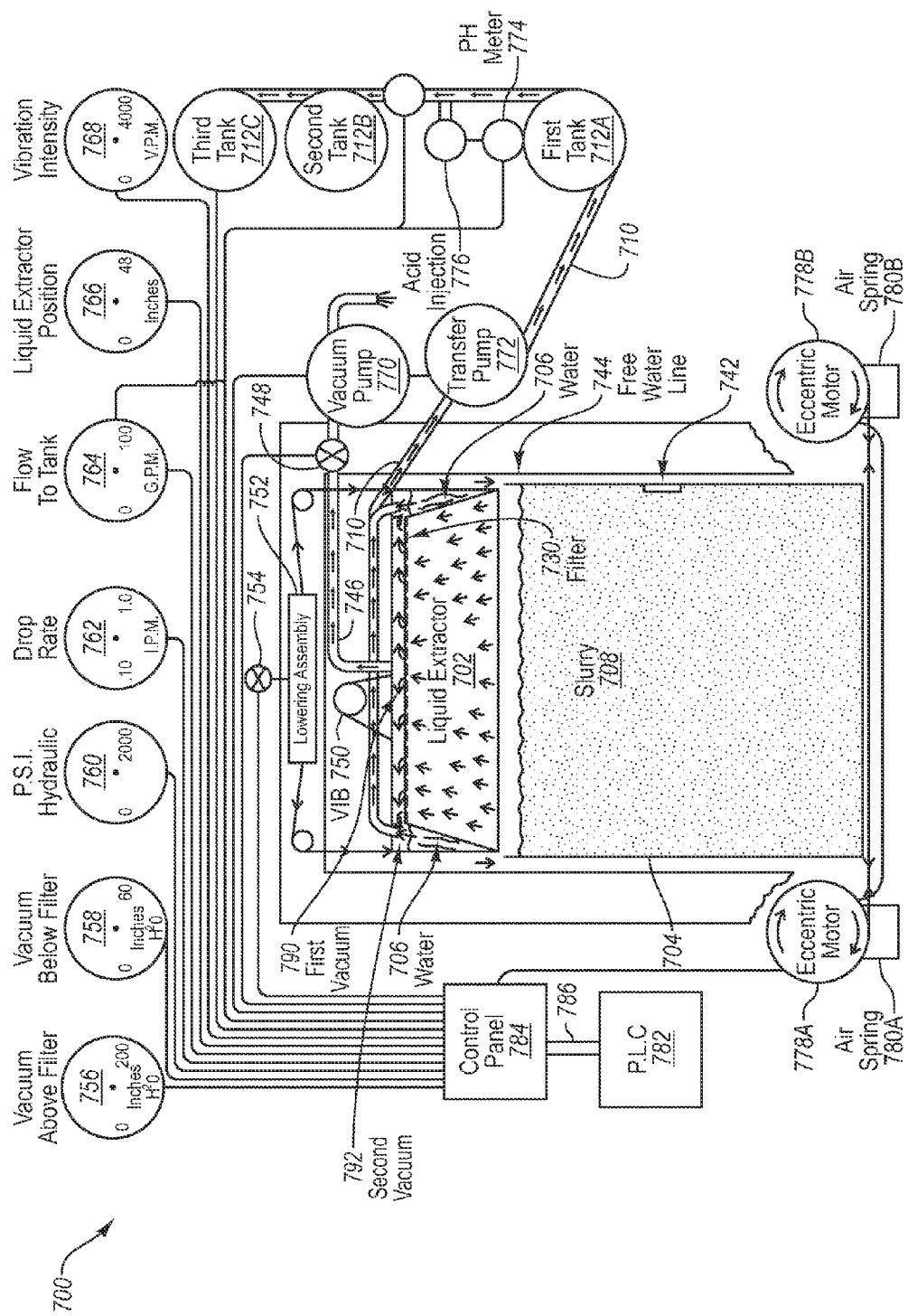
FIG. 7A-B are diagrams illustrating one embodiment of a liquid extraction system in accordance with the present systems and methods.
Figure 7B:
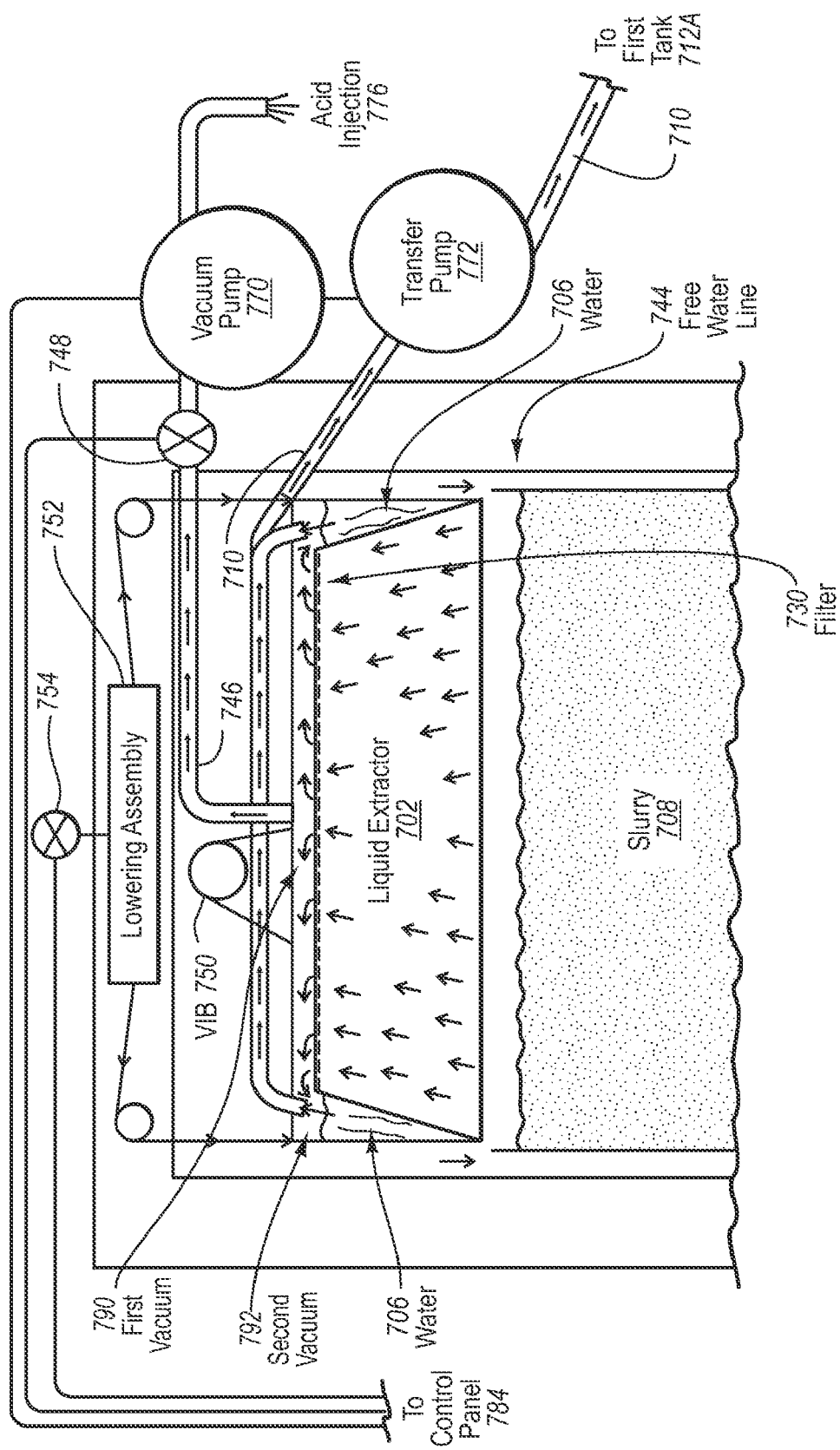

FIG. 7A-B are diagrams (FIG. 7B being a close-up view of a portion of FIG. 7A) illustrating one embodiment of a liquid extraction system 700 in accordance with the present systems and methods. The system 700 includes a liquid extractor 702 positioned above a container 704. In one example, a slurry material 708 is inside the container 704. The system 700 further includes a programmable logic controller (PLC) 782. The PLC 782 may be connected 786 to a control panel 784. The control panel 784 may receive commands from the PLC 782 for various components within the liquid extraction system 700. In one embodiment, the control panel 784 may activate or deactivate the various components based upon the commands received from the PLC 782.

In one embodiment, the control panel 784 may be connected to one or more eccentric motors 778A, 778B. When the eccentric motors 778A, 778B are activated, they may turn and vibrate against the container 704. The vibration may facilitate liquid within the slurry material 708 to gravitate towards the surface of the slurry material 708. The eccentric motors 778A, 778B may be placed on air springs 780A, 780B in order to prevent an energy loss of vibration from transferring to the earth. A heating element 742 may be attached to the container 704. The heating element 742 may produce heat to assist the liquid within the slurry material 708 to rise to the surface of the slurry 708.

The controller 784 may also be connected to a lowering assembly 752. The assembly 752 may be an hydraulic cylinder that lowers the liquid extractor 702 into the container 704. An hydraulic flow control 754 may be used to regulate the rate at which the lowering assembly 752 lowers the liquid extractor 702. A drop rate gauge 762 may be connected to the control panel 784 to indicate the rate at which the extractor 702 is being lowered into the container 704. For example, the drop rate gauge 762 may indicate the drop rate of the extractor 702 in inches per minute (IPM).

In one embodiment, the drop rate of the extractor 702 may be determined by the weight of the liquid extractor 702. The weight may be calculated according to the pressure placed upon the lowering assembly 752. The weight may be measured in pounds per square inch (PSI) according to the hydraulic pressure on the lowering assembly 752. A PSI hydraulic gauge 760 may indicate the pressure on the assembly 752 caused by the liquid extractor 702. The PLC 782 may command the hydraulic flow control to be increased or decreased based upon the reading on the PSI hydraulic gauge 760.

In one configuration, lowering the extractor 702 into the container 704 decreases atmospheric pressure within the liquid extractor 702. The decrease of pressure allows for liquid on the surface of the slurry material 708 to be drawn into the extractor 702 to a predetermined level. In one example, the liquid may be drawn into the extractor 702 to a level of between six and nine inches below a filter 730. In addition, 0.05 to 2.5 inches of liquid may exist in the extractor 702 above the filter 730. A free water line 744 may indicate a boundary between the free standing liquid accumulated on the surface of the slurry material 708 and the slurry material itself. As liquid is extracted from the container 704, the slurry material 708 may settle and more water may accumulate on the surface of the slurry material 708, causing the free water line 744 to fall, and allowing the extractor 702 to be lowered to greater depths within the container 704.

In one embodiment, liquid that is drawn into the extractor 702 is passed through the filter 730. The filtered liquid may accumulate in side pockets of the extractor 702. For example, the liquid may be water 706 which flows to the side of the extractor 702 after passing through the filter 730. One or more sensors may be placed in the extractor 702, below the filter 730. For example, a lower vacuum gauge 758 may indicate the amount of liquid being passed through the extractor 702 below the filter 730. The PLC may vary the drop rate of the extractor 702 based on the readings of the lower vacuum gauge 758. If the lower vacuum gauge 758 indicates a negative value, the extractor 702 may not be lowered into the container 704 manually. The extractor 702 may be lowered automatically when the lower vacuum gauge 758 reaches a predetermined value.

In one embodiment, a first vacuum 790 (also referred to as a first vacuum condition) may be placed in the extractor 702 above the filter 730 with the filter 730 positioned between the first vacuum 790 and the slurry 708 in order to extract air that may be present in the liquid extractor 702. A second vacuum 792 (also referred to as a second vacuum condition) may also be placed in the extractor 702 above the filter 730 with the filter 730 positioned between the second vacuum 792 and the slurry 708 in order to pull the filtered liquid into a first exit tube 710 or a second exit tube 746. For example, water 706 that has been filtered 730 may accumulate in side portions of the extractor 702. The second vacuum 792 may assist the accumulated water to pass from the side portions into a first exit tube 710. In addition, a vibrator 750 and transfer pump 772 (also referred to as a second vacuum source) may also assist in moving the liquid from the side portions to the first exit tube 710. An upper vacuum gauge 756 may indicate the amount of liquid and/or air being passed through the extractor 702 above the filter 730. The PLC may vary the drop rate of the extractor 702 based on the readings of the upper vacuum gauge 756. For example, a predetermined differential between the upper and lower vacuum gauges 756, 758 may indicate that the filter 730 is clogged. The PLC may stop the descent of the extractor 702 until the filter 730 is unclogged.

In one embodiment, a vacuum pump 770 (also referred to as a first vacuum source) may extract air and/or liquid through the second exit tube 746. A vacuum flow control 748 may regulate the flow of the air and/or liquid through the vacuum pump 770. As previously mentioned, the transfer pump 772 may extract liquid from the liquid extractor 702 through the first exit tube 710. The liquid may be transported to a first tank 712A for storage. In one configuration, a pH meter 774 may sample the liquid stored in the first tank 712A and an injection of acid 776 may occur to a portion of the liquid based on the readings of the pH meter 774. The PLC 782 may control the pH meter 774 and the quantity of acid that is injected into the liquid. In one embodiment, the liquid may also be stored in a second tank 712B and a third tank 712C. A flow to tank gauge 764 may indicate the amount of gallons per minute (GPM) that are being transported to the first, second, or third tanks 712A, 712B, 712C. In one embodiment, the liquid transported to the storage tanks 712A, 712B, 712C may be recycled and used within the system 700.

The system 700 may further include a liquid extraction position gauge 766. The position gauge 766 may indicate the distance the liquid extractor 702 has been lowered into the container 704. In addition, the system 700 may include a vibration intensity gauge 768 that indicates how many vibrations per minute (vpm) are being produced by the vibrator 750 and/or the eccentric motors 778A, 778B.

The following provides one example of an implementation of the system 700. 1) The container 704 may be filled with a slurry material 708. 2) The air springs 780A, 780B may be inflated and the eccentric motors 778A, 778B may be initiated to 1000-4000 vpm. 3) In one embodiment, the liquid extractor 702 is lowered to a depth of seven inches below the slurry material 708, as measured from the bottom edge of the extractor 702. 4) The vacuum pump 770 may be set to a minimum of nine inches of liquid, as measured on the bottom side of the filter 730. 5) The transfer pump 772 may transfer the liquid to the first, second, and third tanks 712A, 712B, 712C.

6) The PLC 782 may set the drop rate of the extractor 702 to 0.250 inches per minute. 7) The drop rate may be maintained until a reading of 5 inches of liquid (e.g., water) is indicated below the filter 730. If step 7) occurs, the drop rate of the extractor 702 may be reduced to zero until a reading of 5 inches of liquid (e.g., water) above the filter 730 occurs. 9) Steps 4, 5, 6, 7, and 8 may be restarted. 10) The extractor 702 may continue to be lowered until a psi of 75 is indicated on the lowering assembly 752 (i.e., a hydraulic cylinder). This psi reading may indicate a solid cake of slurry material 708 has formed. 11) The vacuum and pump cycle may be maintained for about 55 minutes. 12) The extractor 702 may be raised out of the container and drained of any remaining liquid from the bottom edges. 13) In one embodiment, the container 704 may be blocked up and the air springs 780A, 780B may be deflated. The container 704 may be picked up by a standard front loader refuse truck or other equipment in order to dispose of the liquidless slurry material in the container 704.

Figure 8:
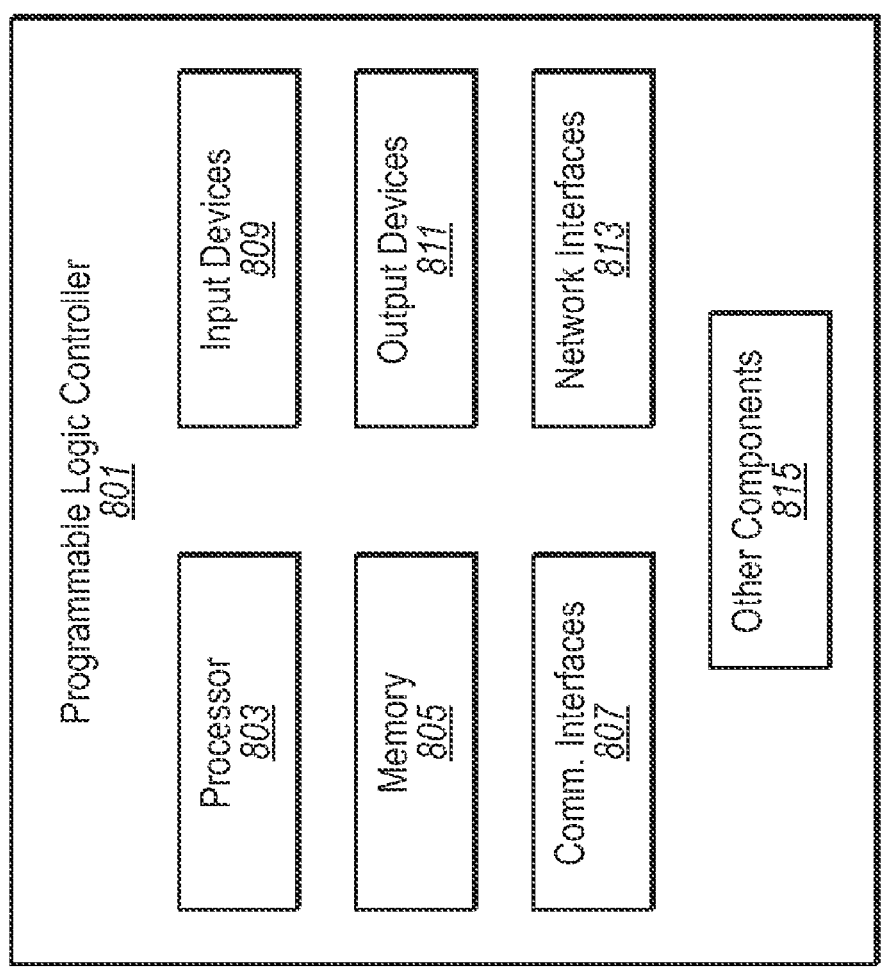
FIG. 8 illustrates various components that may be utilized in a programmable logic controller (PLC).

FIG. 8 illustrates various components that may be utilized in a programmable logic controller (PLC) 801. One or more PLCs 801 may be used to implement the various systems and methods disclosed herein. The illustrated components may be located within the same physical structure or in separate housings or structures. Thus, the term programmable logic controller 801 is used to mean one or more broadly defined computing devices unless it is expressly stated otherwise. Computing devices include the broad range of digital computers including microcontrollers, hand-held computers, personal computers, servers, mainframes, supercomputers, minicomputers, workstations, and any variation or related device thereof.

The PLC 801 is shown with a processor 803 and memory 805. The processor 803 may control the operation of the PLC 801 and may be embodied as a microprocessor, a microcontroller, a digital signal processor (DSP) or other device known in the art. The processor 803 typically performs logical and arithmetic operations based on program instructions stored within the memory 805. The instructions in the memory 805 may be executable to implement the methods described herein.

The PLC 801 may also include one or more communication interfaces 807 and/or network interfaces 813 for communicating with other electronic devices. The communication interface(s) 807 and the network interface(s) 813 may be based on wired communication technology, wireless communication technology, or both.

The PLC 801 may also include one or more input devices 809 and one or more output devices 811. The input devices 809 and output devices 811 may facilitate user input. Other components 815 may also be provided as part of the PLC 801.

FIG. 8 illustrates only one possible configuration of a PLC 801. Various other architectures and components may be utilized.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A liquid extraction unit for extracting liquid from a slurry comprising a liquid and suspended solids, the unit comprising:
    a filter configured to allow passage of the liquid and prevent passage of the suspended solids;
    a first vacuum source configured to create a first vacuum condition in the extraction unit to extract air, the filter being positioned between the slurry and the first vacuum condition; and
    a second vacuum source configured to create a second vacuum condition in the extraction unit to remove the liquid, the filter being positioned between the slurry and the second vacuum condition;
    wherein a drop rate of the liquid extraction unit is controlled by a programmable logic controller.

2. The liquid extraction unit of claim 1, wherein the liquid extraction unit is connected to a lowering assembly that lowers the extraction unit.

3. The liquid extraction unit of claim 2, wherein the lowering assembly is a hydraulic cylinder.

4. The liquid extraction unit of claim 1, wherein the drop rate is determined by the amount of liquid within the extraction unit that is between the slurry and the filter.

5. The liquid extraction unit of claim 1, wherein the drop rate is determined by the amount of liquid within the extraction unit that has passed through the filter.

6. The liquid extraction unit of claim 1, wherein the drop rate is determined by a weight of the extraction unit.

7. The liquid extraction unit of claim 6, wherein the weight of the extraction unit is determined by a hydraulic pressure on the lowering assembly.

8. The liquid extraction unit of claim 1, further comprising a liquid transfer tube configured to transfer liquid from the extraction unit to an external storage container.

9. The liquid extraction unit of claim 1, further comprising one or more side pockets configured to collect and store the liquid until the liquid is transferred from the extraction unit to an external storage container.

* * * * *